United States Patent Office 3,346,606
Patented Oct. 10, 1967

3,346,606
PROCESS OF PREPARING PERFLUOROALKANE-
DISULFONIC ACID SALTS BY CONTACTING
BIS (ALKYLSULFONYL) PERFLUOROALKANES
WITH ALKALI PERMANGANATE
Richard Bernard Ward, Kennett Square, Pa., assignor to
E. I. du Pont de Nemours and Company, Wilmington,
Del., a corporation of Delaware
No Drawing. Filed Jan. 19, 1965, Ser. No. 426,687
11 Claims. (Cl. 260—429)

The present invention is directed to a novel process for the preparation of α,ω-perfluoroalkanedisulfonic acids.

A process for the preparation of perfluoroalkanedisulfonic acids and the acid halides thereof is disclosed in U.S. Patent 2,732,398 and German Patent 1,072,611. The process for preparing perfluoroalkanedisulfonic acids disclosed in these two patents consists of the electrolytic fluorination in liquid HF of the corresponding alkanedisulfonic acids. While this process is certainly adequate, it is difficult to operate commercially since the corresponding alkanedisulfonic acids are not readily available.

It is, therefore, an object of this invention to provide a novel, efficient and convenient process for the manufacture of perfluoroalkanedisulfonic acids.

More specifically, the present invention is directed to a process which comprises contacting a bis-sulfone having the structure $RSO_2(CF_2CF_2)_nSO_2R$, wherein R is an alkyl radical of one to five carbon atoms and $n$ is an integer of from one to twenty, with aqueous alkali permanganate and recovering from the reaction media the acids $HO_3S(CF_2CF_2)_nSO_3H$, or the alkali metal or manganese salts thereof.

The present process comprises treating an α,ω-bis(alkylsulfonyl)perfluoroalkane with an alkali permanganate in an aqueous solution. The process results in the removal of the alkyl groups from the bis(alkylsulfonyl)perfluoroalkane and conversion of the sulfonyl groups of said compound to sulfonic acid groups. In general, all the alkali metal permanganates are useful in this process. However, potassium permanganate is preferred in the present process because of its ready availability.

The process is carried out in a pH range of from about 7.0 to about 9.0. If acidic media below a pH of 7.0 are used, essentially no reaction occurs. If highly alkaline media above a pH of 9.0 are used, a reaction occurs leading to products other than the sulfonic acids. It is necessary, therefore, if the sulfonic acids are to be obtained, to carry the reaction out under the designated neutral or slightly alkaline pH range.

In general, any amount of permanganate will give product. However, in order to obtain complete conversion of the starting materials, it is preferred to use an amount of permanganate in excess of that stoichiometrically required to remove the alkyl groups from the bis(alkylsulfonyl)perfluoroalkane and convert the sulfonyl groups of said compound to sulfonic acid groups.

The temperature of reaction is not critical. The reaction may be conveniently carried out at a temperature of from about 25° C. to 150° C., but temperatures of 100° C. to about 150° C. are preferred since the rate of reaction is more rapid in this temperature range. Since an aqueous medium is used, temperatures above 100° C. require the use of sealed reaction systems and elevated pressures. The starting materials are increasingly insoluble in water as the value of $n$ becomes greater than about 5. Hence, when these less soluble starting materials are used it is particularly preferred to use temperatures above 100° C. in order to increase the solubility of these materials in water.

The above-described process leads to a mixture of manganese dioxide and the alkali metal salt of the disulfonic acid in water. It is generally preferred to remove the manganese dioxide by filtration or like means. If the manganese dioxide is reduced to the manganous compounds with sulfur dioxide or sodium bis-sulfide, a portion of the disulfonic acids are also converted to the manganous salts. Experience has shown that it is more difficult to convert the manganous salts to the free disulfonic acids than the alkali metal salts. For many uses of the product disulfonic acid, the alkali metal salts are completely suitable and hence it is unnecessary to convert them into the free acids. If the free acids are desired, however, they may be obtained by treating the alkali metal salts in a number of manners well known in the art.

The product alkali metal salts may be isolated from the reaction medium by crystallization. However, in some cases, this procedure does not lead to pure products, and it is necessary to resort to other means to obtain the pure salts. One such means which has been found particularly useful is to treat the crude mixture with an ion exchange resin in the acid form which removes inorganic salts, leaving the salts of the product disulfonic acid behind. The thus obtained purified salts may be converted to the free acids by treatment with strong inorganic acids such as sulfuric or hydrochloric acids. The free acids may also be obtained by converting the alkali salts to the barium salts with an ion exchange resin, then treating the barium salts with sulfuric acid. The alkali metal salts may also be converted to the free acids by using an acidic ion exchange resin.

The starting materials $RSO_2(CF_2CF_2)_nSO_2R$ used in the process of the present invention are bis-sulfones wherein R is an alkyl group of one to five carbon atoms and $n$ is an integer from one to twenty. For most practical uses, however, those products having values of $n$ from one to ten are preferred. The bis-sulfones utilized in the present invention are obtained by oxidation of the corresponding bis-sulfides $RS(CF_2CF_2)_nSR$. In general, this oxidation involves the treatment of the bis-sulfides with oxidizing agents such as hydrogen peroxide and acetic acid, chromic acid and sulfuric acid, concentrated or fuming nitric acid or acetic potassium permanganate. For example, the bis-sulfone $CH_3SO_2(CF_2CF_2)SO_2CH_3$ can be prepared by heating for four hours a solution of 30% hydrogen peroxide in glacial acetic acid with 1,2-bis(methylthio)tetrafluoroethane ($CH_3SCF_2CF_2SCH_3$). The mixture is then cooled and poured into water to precipitate the product $CH_3SO_2CF_2CF_2SO_3CH_3$ which is subsequently filtered from the mixture and recrystallized from methanol. The bis-sulfides $RS(CF_2CF_2)_nSR$, which are starting materials for the preparation of the sulfones, are obtained by the reaction of RS—SR with tetrafluoroethylene as more fully described in U.S.P. 2,443,003. The starting materials for this invention are available with $n$ having values of one to several hundred. When $n$ is greater than about twenty, however, these products are so water insoluble that they do not take part in the present process.

As disclosed in the German Patent 1,072,611, the perfluoroalkane-disulfonic acids prepared by the process of this invention are useful in that they are readily converted to their corresponding dicarboxylic acids by reaction with nitric oxides.

Representative examples illustrating the present process follow. All parts are by weight unless otherwise specified.

*Example 1*

Thirty parts of potassium permanganate, 12.5 parts of 1,6-bis(methylsulfonyl)dodecafluorohexane, and 200 parts of water were heated together at 150° C. for six hours in a sealed vessel. The mixture was filtered to remove manganese dioxide, and excess potassium ions were removed by treatment of the solution at 80° C. with the hydrogen ion form of a cationic ion exchange resin (Dowex 50, H+). The slightly acid solution was evaporated until, on cooling, dipotassium dodecafluorohexane-1,6-disulfonate crystallized. The product obtained amounted to 11.2 parts, which represented a 77% yield.

The salt was then converted to the free acid by treatment with strong sulfuric acid. The dodecafluorohexane-1,6-disulfonic acid was recovered in good yields from this acid solution by filtration.

When the sodium permanganate, rubidium permanganate or cesium permanganate are substituted for the potassium permanganate in the preceding example, substantially the same results are obtained.

*Example 2*

Two hundred parts of potassium permanganate, 125 parts of 1,6-bis(methylsulfonyl)dodecafluorohexane and 4000 parts of water were heated under reflux. The slow reaction was accelerated by the periodic addition of portions of acetone (0.5 part). When the color of the permanganate had disappeared, 150 more parts of potassium permanganate were added and the process continued. Finally, excess oxidant was destroyed by adding excess acetone and heating under reflux. The potassium salt was isolated as in Example 1. The product salt amounted to 126 parts which represented a yield of 86%.

*Example 3*

Sixty parts of potassium permanganate, 15 parts of 1,2-bis(methylsulfonyl)tetrafluoroethane, and 1500 parts of water were refluxed together for twenty-four days, but the reaction appeared complete within one hour and began before reflux commenced. The excess oxidant in the mixture was destroyed with sulfur dioxide and the dried solutes extracted with anhydrous ethanol in a Soxhlet apparatus. There was obtained from the mixture 9.5 parts of crystalline product, which was found to be the manganese salt of tetrafluoroethane-1,2-disulfonic acid. The nuclear magnetic resonance and infrared spectra confirmed the structural determination.

*Analysis.*—Calculated for $C_2F_4S_2O_6Mn \cdot 2H_2O$: C, 6.8; H, 1.15; F, 21.6; S, 18.2. Found: C, 7.0; H, 1.15; F, 22.1; S, 17.7.

*Example 4*

Thirty-seven parts of 1,10-bis(methylsulfonyl)eicosafluorodecane, 60 parts of potassium permanganate and 1500 parts of water were refluxed for 190 hours and the dipotassium salt was isolated as in Example 3. There was obtained from the mixture 24 parts of dipotassium eicosafluorodecane-1,10-disulfonate.

*Analysis.*—Calculated for $C_{10}F_{20}S_2O_6K_2$: C, 16.3; F, 51.5; K, 10.6; S, 8.7. Found: C, 16.5; H, 0.2; F, 51.8; S, 8.2; K, 10.3.

The infrared spectrum confirmed the analysis.

*Example 5*

Twenty parts of 1,4-bis(methylsulfonyl)octafluorobutane and 60 parts of potassium permanganate in 1500 parts of water were heated under reflux. The reaction appeared complete in approximately 1.5 hours, but heating was maintained for 24 hours. The dipotassium salt was isolated as in Example 3. The product was analyzed to be the crystalline dipotassium salt of octafluorobutane-1,4-disulfonic acid. The nuclear magnetic resonance and infrared spectra were consistent with this determination.

The salt was then converted in good yield to the free octafluorobutane-1,4-disulfonic acid by using an acidic ion exchange resin.

When other alkali permanganates, such as sodium permanganate and lithium permanganate, are substituted for the potassium permanganate in the above procedure, similar results are obtained.

*Example 6*

One hundred parts of dried dipotassium dodecafluorohexane-1,6-disulfonate were heated with 270 parts of phosphorus pentachloride and 80 parts of zinc chloride to 250° C. and the volatile products from the mixture trapped. The volatile products were distilled to give 76 parts of dodecafluorohexane-1,6-disulfonyl chloride having a boiling point of 138° C./40 mm.

*Analysis.*—Calculated for $C_6Cl_2F_{12}S_2O_4$: C, 14.4; Cl, 14.2; F, 45.7; S, 12.8. Found: C, 14.1; H, <0.1; Cl, 14.5; F, 47.7; S, 12.6.

The infrared and nuclear magnetic resonance spectra were consistent with this structural determination.

Since it is obvious that many changes and modifications can be made in the above-described details without departing from the nature and spirit of the invention, it is to be understood that the invention is not to be limited to said details except as set forth in the appended claims.

The embodiments of the invention in which an exclusive property or privilege is claimed are defined as follows:

1. A process which comprises contacting a bis-sulfone having the structure $RSO_2(CF_2CF_2)_nSO_2R$, wherein R is an alkyl group of one to five carbon atoms and n is an integer of from one to twenty, with aqueous alkali permanganate in a pH range of from about 7.0 to 9.0 and recovering the corresponding alkali metal salt of the acid $HO_3S(CF_2CF_2)_nSO_3H$ from the reaction mixture.

2. A process which comprises contacting a bis-sulfone having the structure $RSO_2(CF_2CF_2)_nSO_2R$, wherein R is an alkyl group of one to five carbon atoms and n is an integer of from one to twenty, with aqueous alkali permanganate in a pH range of from about 7.0 to 9.0 thereby forming the corresponding alkali metal salt of the acid $HO_3S(CF_2CF_2)_nSO_3H$, and thereafter converting said alkali metal salt to the free perfluoroalkanedisulfonic acid.

3. The process of claim 2 wherein the bis-sulfone is $CH_3SO_2CF_2CF_2SO_2CH_3$.

4. The process of claim 2 wherein the bis-sulfone is $CH_3SO_2(CF_2CF_2)_2SO_2CH_3$.

5. The process of claim 2 wherein the bis-sulfone is $CH_3SO_2(CF_2CF_2)_3SO_2CH_3$.

6. The process of claim 2 wherein the bis-sulfone is $CH_3SO_2(CF_2CF_2)_4SO_2CH_3$.

7. The process of claim 2 wherein the bis-sulfone is $CH_3SO_2(CF_2CF_2)_5SO_2CH_3$.

8. The process of claim 1 wherein the alkali metal salt is converted to the manganese salt of the acid $$HO_3S(CF_2CF_2)_nSO_3H$$

9. The process of claim 1 wherein the alkali metal salt is converted to the acid chloride by heating said salt with phosphorus pentachloride and zinc chloride.

10. A process which comprises contacting a bis-sulfone having the structure $RSO_2(CF_2CF_2)_nSO_2R$, wherein R is an alkyl group of one to five carbon atoms and n is an integer of from one to twenty, with aqueous potassium permanganate in a pH range of from about 7.0 to 9.0 and recovering the dipotassium salt of the corresponding acid $HO_3S(CF_2CF_2)_nSO_3H$ from the reaction mixture.

11. The process of claim 10 wherein the dipotassium salt is converted to the free perfluoroalkanedisulfonic acid.

References Cited

UNITED STATES PATENTS 2,697,722  12/1954  Johnson et al. _____ 260—513
2,727,920  12/1955  Johnson et al. _____ 260—513

OTHER REFERENCES

Migrichian: Organic Synthesis, vol. 1, New York (1957) 722–724.

RICHARD K. JACKSON, *Primary Examiner.*

M. WEBSTER, *Assistant Examiner.*